(12) United States Patent
Lewis

(10) Patent No.: US 10,958,499 B2
(45) Date of Patent: Mar. 23, 2021

(54) TRANSPORTING DIGITAL DATA IN A DISTRIBUTED ANTENNA SYSTEM

(71) Applicant: Maven Wireless Sweden AB, Kista (SE)

(72) Inventor: Michael Lewis, Märsta (SE)

(73) Assignee: Maven Wireless Sweden AB, Kista (SE)

( * ) Notice: Subject to any disclaimer, the term of this patent is extended or adjusted under 35 U.S.C. 154(b) by 0 days.

(21) Appl. No.: 16/464,513

(22) PCT Filed: Nov. 29, 2017

(86) PCT No.: PCT/EP2017/080840
§ 371 (c)(1),
(2) Date: May 28, 2019

(87) PCT Pub. No.: WO2018/099984
PCT Pub. Date: Jun. 7, 2018

(65) Prior Publication Data
US 2020/0169447 A1     May 28, 2020

(30) Foreign Application Priority Data
Nov. 29, 2016   (SE) .................................... 1651561-1

(51) Int. Cl.
| H04L 27/38 | (2006.01) |
| H04B 7/022 | (2017.01) |
| H04B 7/08 | (2006.01) |
| H04W 88/08 | (2009.01) |

(52) U.S. Cl.
CPC ......... *H04L 27/3881* (2013.01); *H04B 7/022* (2013.01); *H04B 7/08* (2013.01); *H04W 88/08* (2013.01)

(58) Field of Classification Search
CPC ... H04W 88/085; H04W 88/06; H04W 88/08; H04L 27/3881; H04B 7/022; H04B 7/08
See application file for complete search history.

(56) References Cited

U.S. PATENT DOCUMENTS

| 8,929,288 | B2 | 1/2015 | Stewart et al. | |
| 2009/0190635 | A1* | 7/2009 | Neurohr | H04B 1/005 375/219 |
| 2012/0314797 | A1* | 12/2012 | Kummetz | H04L 27/34 375/295 |
| 2013/0201916 | A1 | 8/2013 | Kummetz et al. | |
| 2015/0156284 | A1* | 6/2015 | Akhter | H04L 69/04 370/477 |

OTHER PUBLICATIONS

Crochiere, R.E., et al., "Interpolation and Decimation of Digital Signals—A Tutorial Review," Mar. 1981, pp. 300-331, vol. 69(3), XP615159, Proceedings of the IEEE.
(Continued)

*Primary Examiner* — Sung S Ahn
(74) *Attorney, Agent, or Firm* — RatnerPrestia

(57) ABSTRACT

A method of transporting digital data in an active distributed antenna system DAS. The method includes receiving data from at least one data source, processing the received data, and providing the processed data as digital real-valued passband data for further transport within the DAS. An apparatus and computer program configured to perform the method are also provided.

20 Claims, 7 Drawing Sheets

(56) References Cited

OTHER PUBLICATIONS

Delmade et al., "Performance Comparison of Optical Fronthauling Techniques for Centralised Radio Access Network", 2016 IEEE International Conference on Advanced Networks and Telecommunications Systems (ANTS), Nov. 6, 2016—pp. 1-6.

International Preliminary Report on Patentability for International Application No. PCT/EP2017/0808040, dated Feb. 21, 2019—44 pages.

International Search Report and Written Opinion for International Application No. PCT/EP2017/080840, dated Feb. 20, 2018—12 pages.

Pearce, D., "The Equivalent Baseband, Getting Started with Communications Engineering", Feb. 19, 2009, pp. 1-18, Retrieved from the Internet: http://www-users.york.ac.uk/~dajp1/Introductions/ GSW_Equivalent_Baseband.pdf.

\* cited by examiner

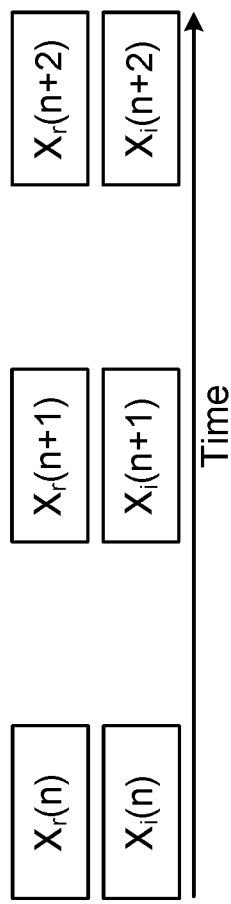
Fig. 2
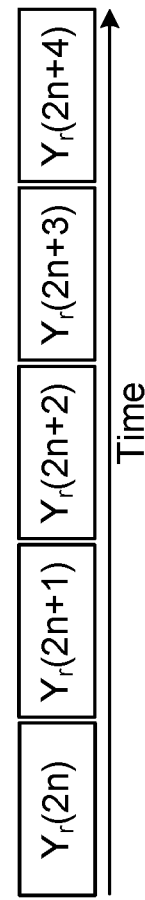
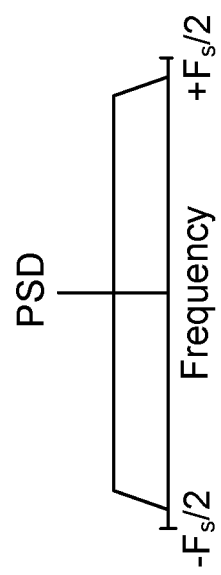
Fig. 4
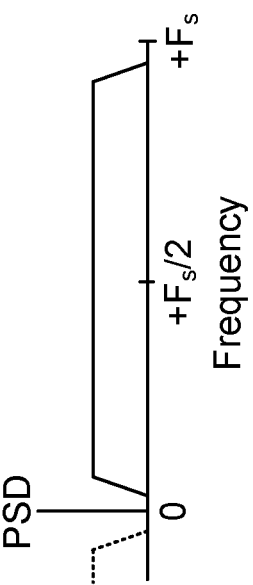

TRANSPORTING DIGITAL DATA IN A DISTRIBUTED ANTENNA SYSTEM

This application is a U.S. National Phase application of PCT International Application No. PCT/EP2017/080840, filed Nov. 29, 2017, which claims the benefit of Swedish Application No. 1651561-1, filed Nov. 29, 2016, both of which are incorporated by reference herein.

TECHNICAL FIELD

The invention relates to the implementation of an active distributed antenna system (DAS) transporting digital passband data.

BACKGROUND

A distributed antenna system (DAS) is a technology for providing radio coverage in an area which cannot be directly served from a radio base station, and is particularly advantageous in applications where multiple wireless service providers need to provide coverage since a single DAS can be used with many radio base stations.

A state of the art DAS 100 uses digital transport for radio signals as shown in FIG. 1. For the sake of brevity, only one direction of the signal path is shown and for a single band only. In practice, a DAS is bidirectional, carrying downlink signals from radio base stations (RBS) 101-104 as shown in FIG. 1 to coverage areas provided by remote antennas 105, 106 for serving wireless communication devices (not shown), such as smart phones and tablets. Uplink signals are carried in the opposite direction, from the wireless communication devices to the RBSs. A DAS will usually support multiple frequency bands in both downlink and uplink.

In general, the DAS 100 consists of one or more source units 107, 108, which each interface to one or more base stations 101-104, and one or more remote units 109, no which drive the antennas 109, 110 in the respective coverage area. In between the source units 107, 108 and the remote units 109, no there may be some type of routing unit 111, either as one or more separate units, or integrated into the source and remote units, or some combination thereof. In the example of FIG. 1, a single routing unit 111 is shown.

In the example DAS of FIG. 1 there is analogue feed, and the base station input signals for a frequency band are presented to each source unit as a combined signal at a respective analogue-to-digital converter 112, 113 (ADC).

The bandwidth of the signal into the ADCs 112, 113 is defined by the minimum and maximum frequencies allowed for base station input signals in the band of interest. As an example, the 1800 MHz Digital Cellular System (DCS) cellular band has a downlink frequency range of 1805.2 to 1879.8 MHz. This is typically a much wider band than that of any individual signal from the RBSs 101-104, and the ADC sample rate must be high enough to sample the entire input signal band. As an example, in order to avoid aliasing, the sample rate of the ADCs 112, 113 must exceed twice the total bandwidth, i.e. in this particular example 2*(1879.8−1805.2)=149.2 MHz.

A number of channel filters 114-117 separate the individual channels of the respective base station 101-104 into independent streams of samples. These individual streams of samples corresponding to signals transferred over each channel of the RBSs are scheduled and serialized by a scheduler 118, 119 and a serializer 120, 121 for transmission over high speed digital links 122, 123 such as Common Public Radio Interface (CPRI) links using fiber-optic connections. As can be concluded, this is problematic for the scheduler 118, 119 and the serializer 120, 121, since the ADCs 112, 113 must sample incoming data at a high sample rate, resulting in a great amount of digital data arriving at the scheduler/serializer.

At the routing unit 111, the samples are de-serialized 124, 125 and passed onto a routing function 126 which forwards the samples to the required output ports. At each output port, the set of samples destined for that port are again scheduled and serialized by a scheduler 127, 128 and a serializer 129, 130 for transmission over high speed digital links 131, 132.

Finally, at each remote unit 109, no, the samples are de-serialized 133, 134 and passed to transmit filtering functions 135-138, which are configured to recreate the original radio signals for each channel being transported. The outputs of all the transmit filtering functions 135-138 for a frequency band are summed and passed to a respective digital-to-analogue converter 139, 140 (DAC) to recreate an analogue signal which can be amplified and transmitted over the antennas 105, 106 providing the coverage areas serving the wireless communication devices.

Source units 107, 108 can also be designed which have a purely digital interface to each base station 101-104, in which case the signals to be transmitted are transmitted in the form of digital samples. In this case, the role of the receive filtering 114-117 is to format and convert the digital samples from the base stations 101-104 into a format suitable for transmission through the DAS 100.

Signals in the "real" world exist over a finite range of frequencies, such as radio frequency (RF) signals transmitted by the respective base station 101-104, and when sampled (e.g. by the analogue-to-digital converter 112, 113) can be represented by a sequence of digital samples.

U.S. Pat. No. 8,929,288 discloses a DAS including a host unit and a plurality of remote units. The host unit includes a plurality of base transceiver stations and a switch. Each of the base transceiver stations is configured to provide a downstream baseband digital signal to the switch and to receive an upstream baseband digital signal from the switch, wherein each downstream baseband digital signal and upstream baseband digital signal is a digital representation of the original radio frequency channel at baseband of the respective base transceiver station. The switch is configured to route each of the downstream baseband digital signals to a respective subset of the remote units as one or more downstream serial data streams and to route each of the upstream baseband digital signals from one or more upstream serial data streams to a respective subset of the base transceiver stations.

Further, the standardized Common Public Radio Interface (CPRI) interface specification "Common Public Radio Interface (CPRI), Interface Specification", currently Version 6.0, advocates serialization of baseband data over a high speed digital link between a baseband unit and a radio head. Digital DAS implementations have followed this approach, such as the system described in U.S. Pat. No. 8,929,288 where baseband samples are serialized over a digital link.

Processing the digital data at baseband in the DAS has its advantages. With reference to FIG. 2, where a digital baseband representation of the original radio frequency signal is illustrated, it can be seen that with such a digital baseband representation each data sample is represented as a complex number (consisting of a real and an imaginary components). It is noted that the real and imaginary components of a baseband signal practically extend from 0 Hz to a higher cut-of frequency, such as just below 10 kHz. Negative frequencies are mirrors of the corresponding positive frequency components.

The well-known Nyquist's theorem teaches that as long as the occupied bandwidth of a signal is less than half of the sample rate $F_s$ then the analogue signal can be perfectly reconstructed from the stream of digital samples.

As can be seen in the left-hand power spectral density (PSD) illustration of FIG. 2, the combined complex representation allows for a two-sided power spectrum where negative frequency components can be different from positive frequency components, allowing a total bandwidth up to the sample rate $F_s$.

From a signal processing perspective such a representation is commonly used because, among other reasons, as shown in the right-hand time domain illustration, it allows the real and imaginary components to be processed in parallel. Digital baseband signals are commonly referred to as IQ data, i.e. user plane information in the form of in-phase and quadrature modulation data. This IQ modulation enables the digital data to be represented by the real and imaginary components shown in the right-hand time domain illustration of FIG. 2.

A DAS needs to deal with a wide range of signals corresponding to different cellular operators and mobile transmission standards. This means that a wide range of different signal bandwidths may be presented, for example within the total ADC input bandwidth. The minimum sample rate for a wideband signal is larger than that for a narrowband signal, and so the range of bandwidths which must be supported leads to the need to support a wide range of different sample rates to make efficient use of the available capacity of the digital interconnection. This means that the scheduling process located before each serializer has a challenging task; it is necessary to find a schedule for transmitting data samples for each channel while adding a minimum amount of delay. At each step through the DAS where it is necessary to carry a different mix of samples (for example at each intermediate routing step) it is necessary to provide further buffering to compensate for the extra scheduling delay introduced. The total delay can be critical to the performance of a DAS since there are limits to how much the base stations can be adjusted to compensate for the delay through the DAS.

The flexibility of the schedulers 118, 119 of the DAS 100 in FIG. 1 is limited by the granularity of the data to be transmitted. A baseband data sample consists of two sample values as was illustrated in FIG. 2, the real and the imaginary component, which must both be serialized 120, 121 in order to be transmitted over the digital links 122, 123. This means that the minimum granularity for the schedulers 118, 119 consists of the time taken to process both components.

A drawback with the digital baseband representation discussed in the above is that there is delay associated with the processing of each time domain digital data component.

SUMMARY

An object of the present invention is to solve, or at least mitigate, this problem in the art and to provide an improved DAS and a method of transporting digital data in the DAS.

This object is attained in a first aspect of the invention by a method of transporting digital data in a DAS. The method comprises receiving data from at least one data source, processing the received data, and providing the processed data as digital real-valued passband data for further transport within the DAS.

This object is attained in a second aspect of the invention by a device configured to transport digital data in a DAS, the device comprising a processing unit and a memory, said memory containing instructions executable by said processing unit, whereby said device is operative to receive data from at least one data source, process the received data, and provide the processed data as digital real-valued passband data for further transport within the DAS.

As previously has been discussed, when the real and imaginary component of a complex digital signal is scheduled and serialized in a DAS, a processing delay occurs at the processing of the respective signal components.

Hence if the delay for processing a single one of the real and the imaginary signal component is denoted D, is follows that the delay for processing both components of each sample is 2*D. Inevitably, both components must be processed in order to be transmitted over the high speed links of the DAS.

This problem is advantageously overcome by a method of transporting digital data in a DAS using a passband representation according to the invention. In contrast to a baseband representation, a passband representation does not consist of independent real and imaginary components, but rather can be represented by a single component, such as a purely real-valued signal.

In the DAS proposed with the embodiments of the invention described herein transporting a real-valued digital passband signal, the processing delay of the schedulers and serializers for preparing transport of each data sample over the high speed data link is reduced by 50%, and hence amounts to a processing delay of D for each digital passband data sample as compared to a delay of 2*D as would be the case for each digital baseband data sample consisting of a real and an imaginary component.

In an embodiment, the processing of the received signal includes filtering, in what is referred to as an RX filter, each channel provided by the base stations (or in case of uplink communication; provided by wireless communication terminals). Hence, each respective channel of the base stations is processed by a corresponding frequency-selective RX filter. In this context, a channel should be construed as a set of signals occupying a range of frequencies which the operator wishes to transfer together through the DAS.

Thereafter, the signals of each filtered channel is re-sampled or decimated in the respective RX filter in order to reduce the sample rate $F_s$ of the signal, where the sample rate $F_s$ is adapted to the bandwidth of the signals transported over the respective channel. As can be concluded, the sample rate $F_s$ applied in the RX filters must be at least twice the bandwidth of the highest-bandwidth signal of the filtered channel.

This is highly advantageous, as the resulting sample rate $F_s$ of the real-valued digital passband data provided by each RX filter for further transport within the DAS is adapted to the actual bandwidth of the filtered channel, rather than the total bandwidth of the signals coming into the ADCs 112, 113.

The filtered base station signals have a narrower bandwidth, and can be represented with a lower sample rate than the ADC sampling the incoming composite signal of the base station. For efficient transfer over the digital link, the channel filtering thus also in an embodiment includes one or more stages of decimation or resampling to reduce the sample rate of each base station channel.

As a result, by re-sampling/decimating the signal of the respective filtered base station channel at a lower sample rate $F_s$, using only as high sample rate as necessary taking into account the bandwidth of the filtered channel, the amount of digital passband data provided to the schedulers is greatly reduced while still enabling subsequent reconstruction of the original signal at the remote units for transmission over the antennas. This greatly mitigates the processing burden on the schedulers/serializers.

Further embodiments of the invention will be discussed in the detailed description.

Generally, all terms used in the claims are to be interpreted according to their ordinary meaning in the technical field, unless explicitly defined otherwise herein. All references to "a/an/the element, apparatus, component, means, step, etc." are to be interpreted openly as referring to at least one instance of the element, apparatus, component, means, step, etc., unless explicitly stated otherwise. The steps of any method disclosed herein do not have to be performed in the exact order disclosed, unless explicitly stated.

BRIEF DESCRIPTION OF THE DRAWINGS

The invention is now described, by way of example, with reference to the accompanying drawings, in which:

FIG. 2 illustrates digital baseband data in the frequency domain and time domain;

FIG. 4 illustrates real-valued digital passband data in the frequency domain and time domain;

DETAILED DESCRIPTION

The invention will now be described more fully hereinafter with reference to the accompanying drawings, in which certain embodiments of the invention are shown. This invention may, however, be embodied in many different forms and should not be construed as limited to the embodiments set forth herein; rather, these embodiments are provided by way of example so that this disclosure will be thorough and complete, and will fully convey the scope of the invention to those skilled in the art. Like numbers refer to like elements throughout the description.

Figure 1:
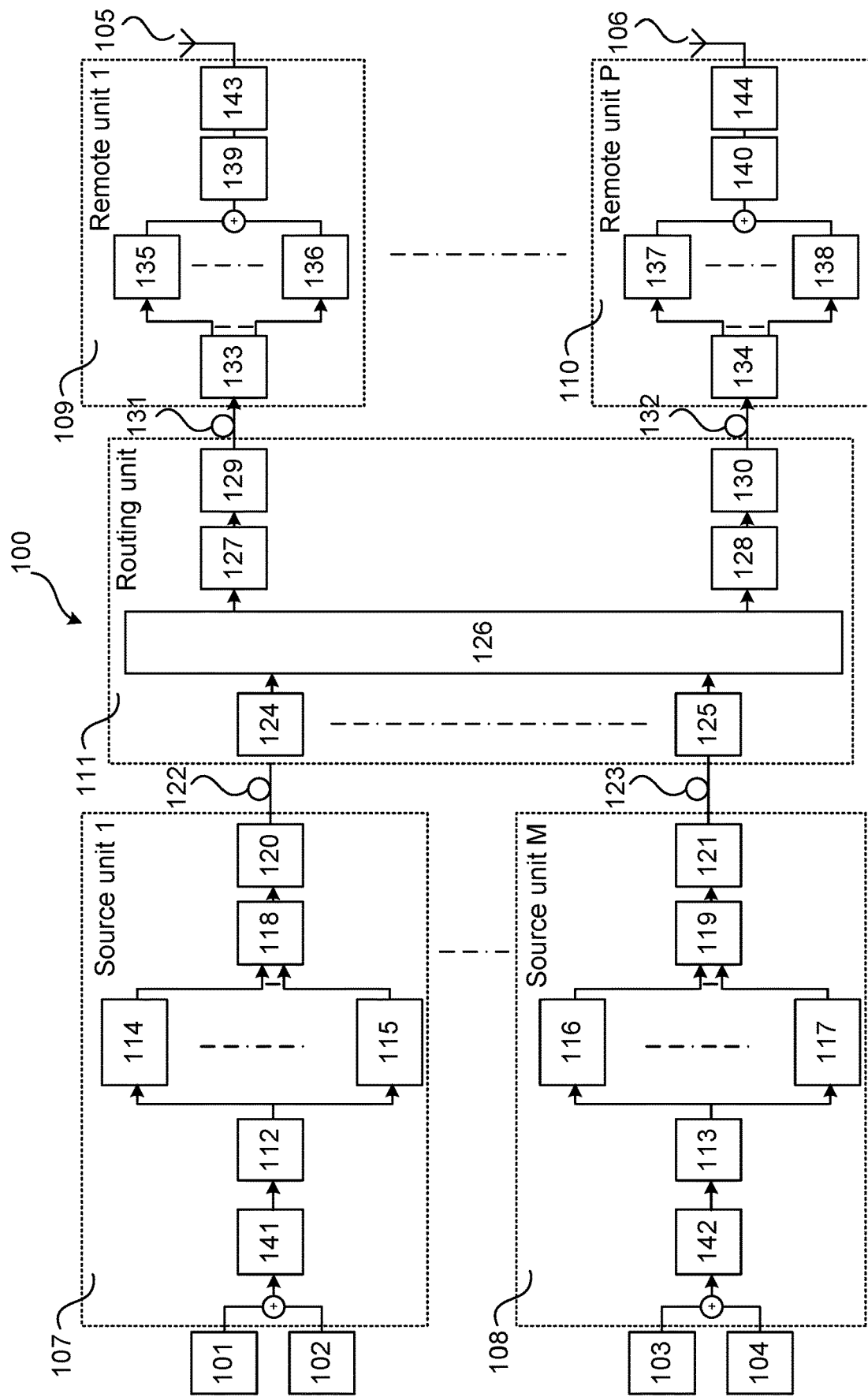
FIG. 1 illustrates a prior art DAS system in which the present invention may be implemented.

FIG. 1 illustrates a prior art DAS in which the present invention may be implemented. The DAS 100 of FIG. 1 has previously been discussed in detail.

FIG. 2 illustrates a frequency domain and a time domain representation of digital baseband data. $X_r(n)$ denotes the real component of the digital signal in the time domain at discrete time sample index n, while $X_i(n)$ denotes the imaginary component of the digital signal in the time domain at discrete time sample index n.

As previously has been discussed, when the respective component of the digital signal is scheduled and serialized by the schedulers 118, 119, and the serializers 120, 121 of the source units 107, 108 and subsequently by the schedulers 127, 128 and serializers 129, 130 of the routing unit 111, a processing delay occurs at the processing of the respective signal components.

Hence if the delay for processing a single one of the two digital signal components is denoted D, is follows that the delay for processing both components of each digital sample is 2*D. Inevitably, both components must be processed in order to be transmitted over the high speed links 122, 123 and 131, 132.

This problem is advantageously overcome by a method of transporting digital data in a DAS using a passband representation. In contrast to a baseband representation, a passband representation does not consist of independent real and imaginary components, but rather can be represented by a single component, such as a purely real-valued signal.

A passband signal occupies a band of frequencies which are only positive (or, equivalently, only negative). It is not necessary that negative and positive frequency components are independent from one another, and therefore the signal does not need both real and imaginary components in order to be represented. A real-valued digital passband signal is defined as being a signal where each sample is represented by a single coordinate. This implies that the possible values for samples of the signal map to a line in the complex plane. This line is typically the real axis in the complex plane, but could equally be the imaginary axis or a straight line at any other position.

Figure 3A:
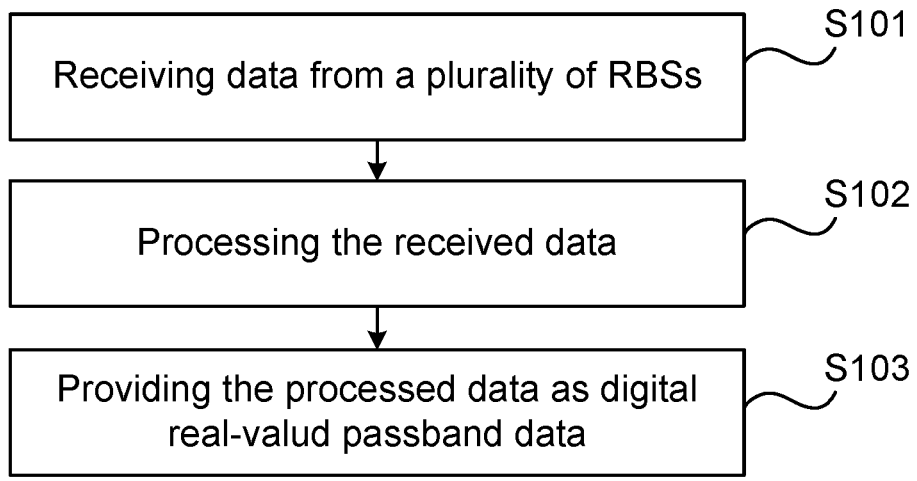
FIG. 3a illustrates a flowchart describing a method according to the basic idea of the invention.

The method of the invention comprises, with reference to the flowchart of FIG. 3a, receiving data in step S101 from at least one data source, which data source may be embodied by the radio base stations (RBSs) 101-104, but could alternatively be an intermediate device which receives an RF signal from the base station and mixes the RF signal down to a lower frequency, such as intermediate frequency (IF), and/or converts the analogue RBS signal to a digital signal.

In the following, it is assumed that any mixing of an RF signal down to a lower-frequency IF signal is performed by an RF mixer/demodulator located between the respective RBS 101-104 and the DAS 100, or within the DAS 100 as illustrated with the mixer/demodulator 141, 142.

The RF signal is typically a passband analogue signal, which when supplied to a DAS (via any mixer device) commonly is a composite of signals from one or more RBSs 101-104, even though a DAS may receive signals from a single RBS. However, in practice, a DAS typically receives signals from numerous different RBSs, which may be operated by various operators each operating at different frequencies. These different channels must be separated by the respective channel RX filter 114-117, and subsequently reconstructed by the respective channel TX filter 135-138 at the remote units 109, 110.

Thereafter, the received data is processed in step S102 accordingly, depending on which type of data it comprises—analogue, digital, RF, IF, baseband, etc.—and the processed data is provided in step S103 to the respective scheduler 118, 119 as real-valued digital passband data for further transport within the DAS 100.

In the downlink, the processing as illustrated in steps S101-S103 is in an embodiment performed in the source units 107, 108 close to the RBSs 101-104 for further downlink transport, while in the uplink the processing of steps S101-S103 is performed in the remote units 109, 110 for further uplink transport. Hence, when data enters the DAS 100—either in an uplink or downlink direction—the data is processed such that it can be provided as real-valued digital passband data for further transport within the DAS 100.

Figure 3B:
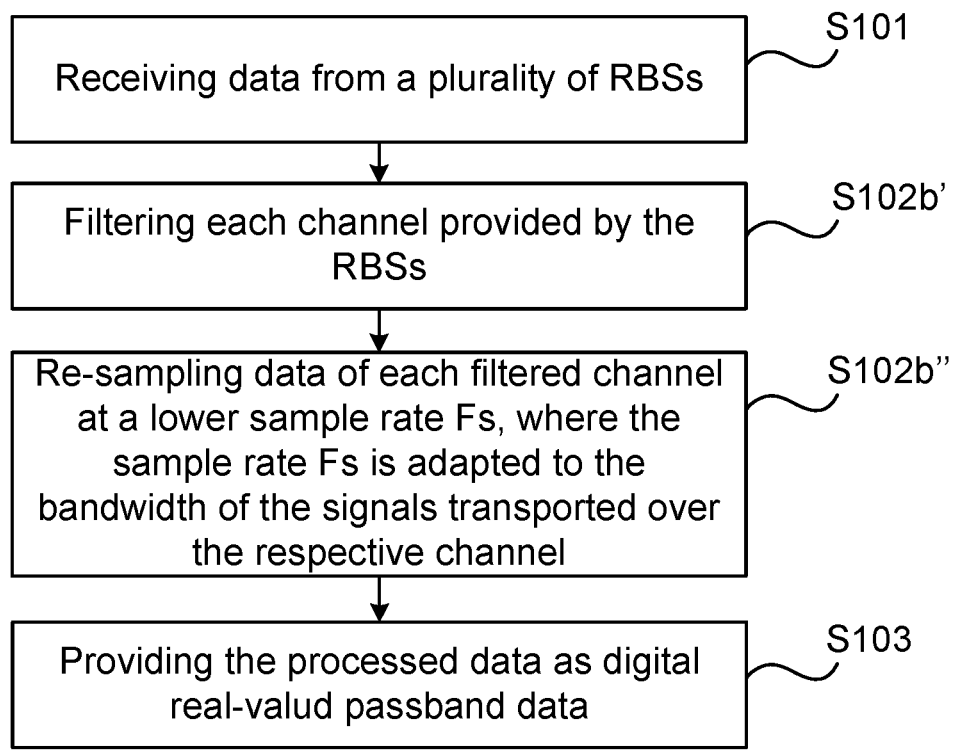
FIG. 3b illustrates a flowchart describing a method according to an embodiment of the invention.

With reference to FIG. 3*b*, in an embodiment, the processing step S102 of FIG. 3*a* includes the further step S102*b*' of filtering, in each RX filter 114-117, each channel provided by the RBSs 101-104. Hence, each respective channel of the RBSs 101-104 is processed by a corresponding RX filter 114-117.

Thereafter, in step S102*b*", the signals of each filtered channel is re-sampled or decimated in the respective RX filters 114-117 in order to reduce the sample rate $F_s$ of the signal, where the sample rate $F_s$ is adapted to the bandwidth of the signals transported over the respective channel. As can be concluded, the sample rate $F_s$ applied in the RX filters 114-117 must be at least twice the bandwidth of the highest-bandwidth signal of the filtered channel.

This is highly advantageous, as the resulting sample rate $F_s$ of the real-valued digital passband data provided by each RX filter 114-117 for further transport within the DAS 100 is adapted to the actual bandwidth of the filtered channel, rather than the total bandwidth of the signals coming into the ADCs 112, 113.

The filtered RBS signals have a narrower bandwidth, and can be represented with a lower sample rate than the ADC 112, 113 sample rate. For efficient transfer over the digital link, the channel filtering thus also in an embodiment includes one or more stages of decimation or resampling to reduce the sample rate of each RBS channel.

As a result, by re-sampling/decimating the signal of the respective filtered RBS channel at a lower sample rate $F_s$, using only as high sample rate as possible taking into account the bandwidth of the filtered channel, the amount of digital passband data provided to the schedulers 118, 119 is greatly reduced while still enabling subsequent reconstruction of the original signal at the remote units 109, 110 for transmission over the antennas 105, 106. This greatly mitigates the processing burden on the schedulers/serializers.

As previously has been described, at each remote unit 109, no, the samples are de-serialized 133, 134 and passed to transmit filtering functions 135-138, which are configured to regenerate the original radio signals for each channel being transported, including interpolation of the sample rate $F_s$ of each signal to a high enough sample rate such that the entire output frequency band corresponding to the ADC input frequency band can be recreated. The outputs of all the transmit filtering functions 135-138 for a frequency band are summed and passed to a respective digital-to-analogue converter 139, 140 (DAC) to recreate an analogue signal which can be amplified and transmitted over the antennas 105, 106 providing the coverage areas serving the wireless communication devices.

FIG. 4 illustrates a real-valued digital passband signal in the frequency domain and in the time domain, respectively. A digital passband signal occupies a specific band of positive frequencies in the frequency domain as shown in the left-hand illustration. The power spectrum at negative frequencies is an identical mirrored version of that at the positive frequencies.

As shown in the right-hand time domain illustration, the digital signal can be represented by a sequence of real-valued samples, as shown in the right-hand illustration. $Y_r(2n)$ denotes the real component of the digital signal in the time domain at discrete time sample index 2n.

Again, according to Nyquist's theorem; as long as the sampling rate $F_s$ is at least twice the bandwidth of the sampled analogue signal, the analogue signal can be perfectly reconstructed from the stream of digital samples. The factor 2 for the sample index indicates that the sample rate for a passband representation must be twice that of a baseband representation with the same information bandwidth.

When comparing the real-valued digital passband signal of FIG. 4 to the digital baseband signal illustrated in FIG. 2, it can be concluded that the digital baseband signal representation enables parallel processing of the real and imaginary components of a data sample, with half the sampling rate $F_s$ of a passband signal having the same bandwidth.

However, in the DAS proposed with the embodiments of the invention described herein transporting a real-valued digital passband signal, the processing delay of the scheduler 118, 119 and serializer 120, 121 for preparing transport of each data sample over the high speed data link 122, 123 is reduced by 50%, and hence amounts to a processing delay of D for each digital passband data sample as compared to a delay of 2*D as would be the case for each digital baseband data sample consisting of a real and an imaginary component.

Figure 5:
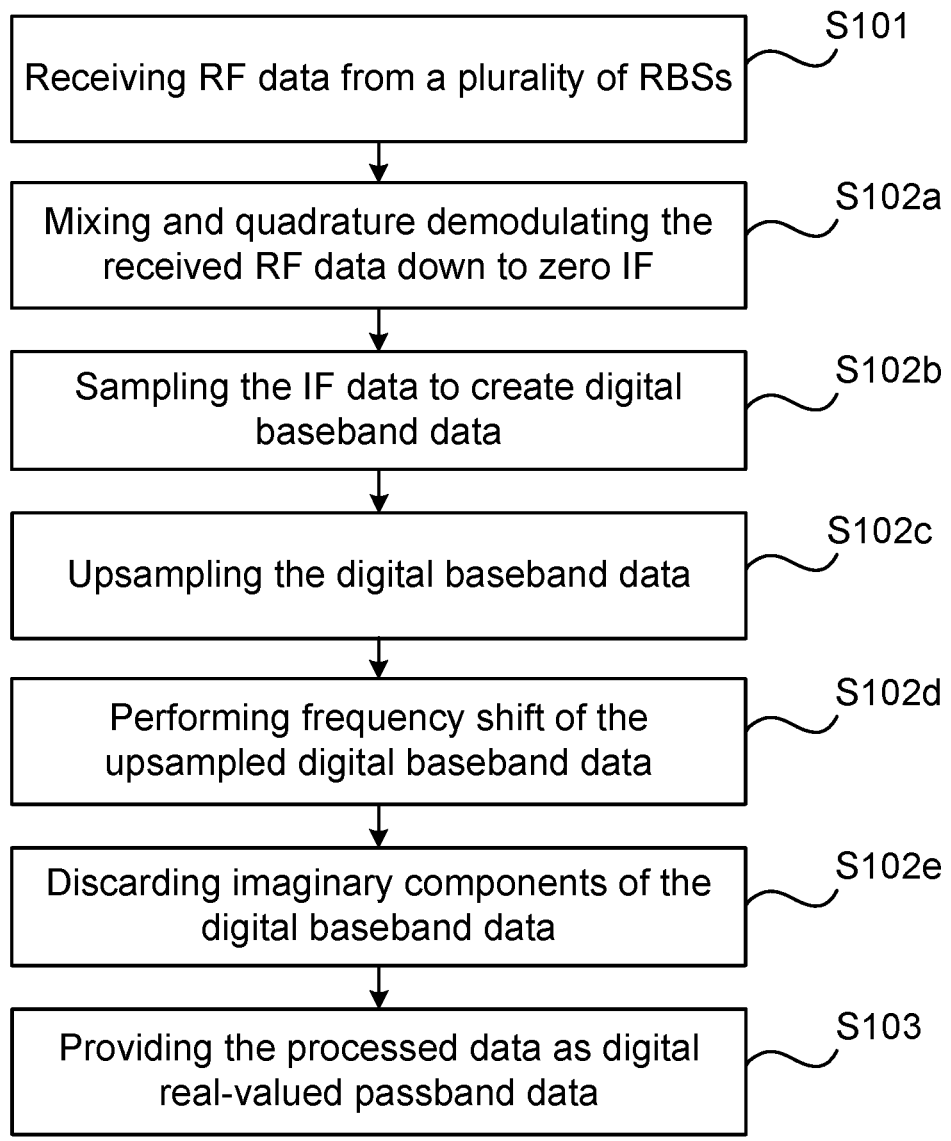
FIG. 5 illustrates a flowchart describing a further embodiment of a method according to the invention.

An embodiment of a method of transporting digital data in a DAS according to the invention will now be described with reference to the flowchart of FIG. 5 and the signals illustrated through FIGS. 6*a-d*.

According to the embodiment, real-valued digital passband data is to be transported by the serializers 120, 121. In this particular embodiment, with reference to the flowchart of FIG. 5, the input to the source units 107, 108 of the DAS 100 is an RF signal which is mixed down to an analogue baseband signal with zero intermediate frequency with a quadrature mixer/demodulator 141, 142 in step S102*a*. This quadrature mixer/demodulator may be located within or outside the source units 107, 108. Hence, it may be envisaged that the DAS 100 receives an IF signal already having been mixed down and quadrature demodulated by an external quadrature mixer/demodulator, in which scenario the DAS 100 would not perform step S102*a*.

In a quadrature mixer/demodulator, two mixers are utilized which mix the same input signal with two different versions of a local oscillator signal which are 90 degrees offset from one another, which produces an output signal which can be treated as a complex representation.

The ADCs 112, 113 will thus sample the analogue IF signal as a complex baseband signal in step S102*b*.

Once the IF signal has been digitized, the processing consists of separating the different signals that make up the composite input signal by frequency-selective filtering as has been discussed hereinabove with reference to FIG. 3*b* in step S102*b*'. Hence, each channel has a frequency-selective digital filter 114-117 whose bandwidth is adapted to the characteristics of the respective signal source, i.e. each filter is tuned to the operating frequency of the corresponding RBS.

As has been previously described, this adaption of the signal bandwidth is performed by re-sampling or decimating the signals of the filtered channels, (step S102*b*" of FIG. 3*b*), advantageously resulting in a lower sample rate $F_s$. It should be noted that this sample rate $F_s$ is substantially lower than that applied by the ADCs 112, 113, which need to accommodated the total bandwidth of signals coming to the DAS 100 over all RBS channels.

Figure 6A:
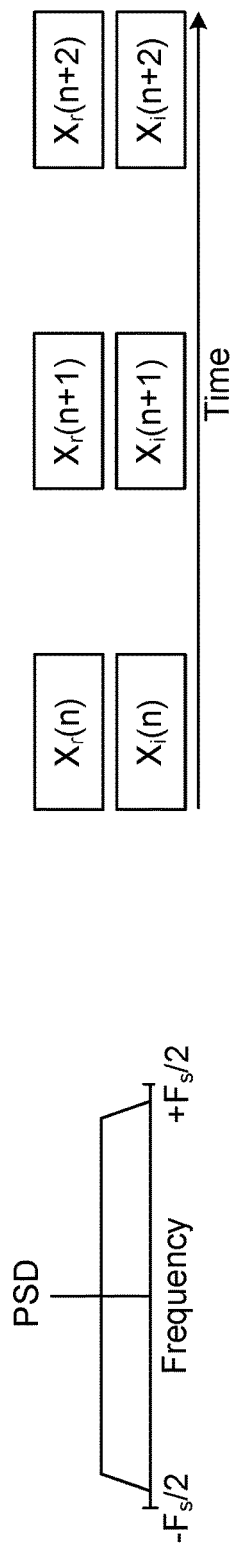
FIGS. 6a-d illustrates transforming digital baseband data to real-valued digital passband data for further transport within the DAS according to an embodiment.

Now, after this filtering, a digital baseband signal—as illustrated in FIG. 6*a* (which previously has been discussed with reference to FIG. 2)—has been obtained for each channel resulting in a digital baseband signal with sample rate $F_s$ (where $F_s$ may be different for each channel, depending on the sample rate needed to represent the filtered signals without aliasing).

This digital baseband signal is in this particular embodiment then transformed into a real-valued digital passband signal using a 3-step approach starting with the step of performing upsampling in step S102c. This step can be omitted if the digital baseband signal already has a sample rate that is at least twice the bandwidth of the information contained in the signal.

In this example, upsampling is performed with a factor 2, i.e. the digital baseband signal is interpolated by a factor 2, thereby doubling the sample rate and increasing the Nyquist bandwidth to 2*Fs.

Effectively, when performing upsampling, zeros are inserted between the original samples to increase the sampling rate, followed by lowpass filtering to smooth the resulting upsampled digital signal, thereby reconstructing the wanted signal across the inserted zeros.

Figure 6B:
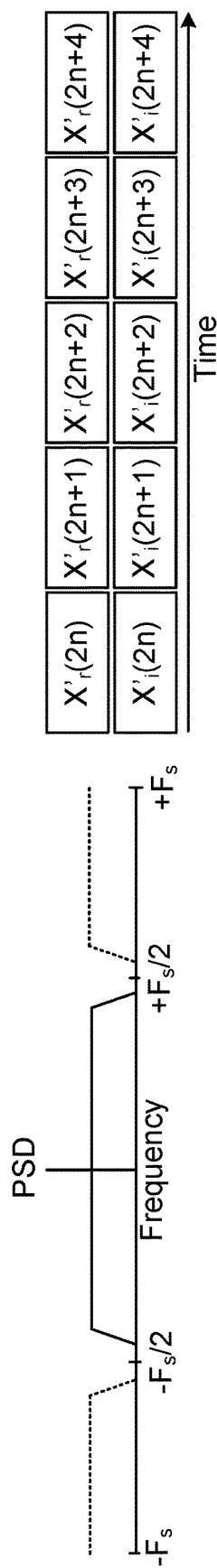

FIG. 6b shows the digital baseband signal being the result of the upsampling of the digital baseband signal of FIG. 6a. It should be noted that the upsampling adds undesired spectral images (indicated with dashed lines) to the sampled signal, which spectral images are centered on multiples of the original sampling rate and must be removed by the lowpass filtering mentioned previously. Thus, with the upsampling, it becomes possible to represent signals in a frequency range from $-F_s$ to $+F_s$. However, the desired signal still lies in the original frequency range of $-F_s/2$ to $+F_s/2$.

After the upsampling of step S102c, as is illustrated in the time domain representation in the right-hand side of FIG. 6b, the same amount of data is present in the upsampled digital baseband signal as compared to the original digital baseband signal of FIG. 6a, but the sampling rate has increased to 2*Fs.

Figure 6C:
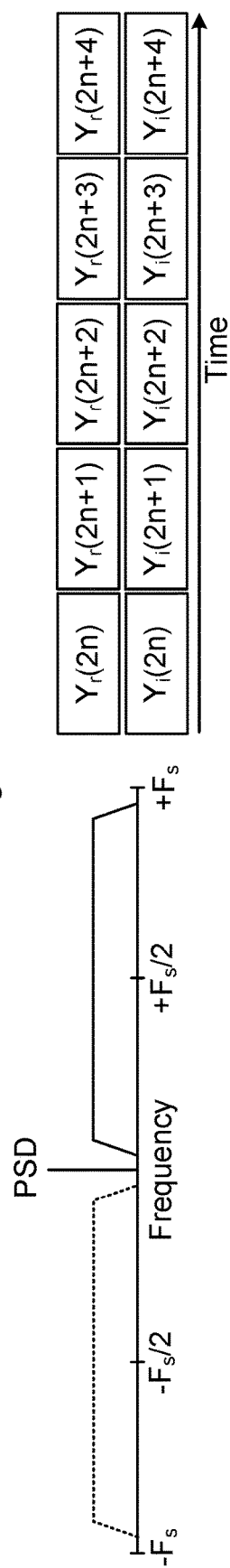

Thereafter, a frequency shift of the upsampled digital baseband signal is performed in step S102d by a frequency $F_s/4$ (of the upsampled frequency, corresponding to $F_s/2$ with respect to the original sample rate applied by the ADCs 112, 113), thereby moving the lower edge of the signal to a positive frequency, in order to create a complex digital passband signal. The result of this operation is illustrated in FIG. 6c. It is also possible to choose a different frequency shift, as long as the result is a passband signal (i.e. the wanted signal is entirely located at positive frequencies or entirely at negative frequencies).

Finally, the imaginary component of the complex digital passband signal illustrated in FIG. 6c is discarded in step S102e, resulting in the signal illustrated with reference to FIG. 6d, i.e. the real-valued digital passband signal previously discussed in detail with reference to FIG. 4 is provided as illustrated with step S103. As compared to the digital baseband signal of FIG. 6a, which is centered at zero frequency, the digital signal of FIG. 5d is centered at $F_s/2$ and consists of a passband of positive frequencies on either side. Without the imaginary component, the negative frequency range becomes a mirror image of the positive frequency range, which means that unique information only can be carried in the frequency range o to $+F_s$; however, it has already been made sure that the desired signal lies in that range. Alternatively, the real component can be discarded; this has the same effect. A center frequency other than $F_s/2$ may be used as long as there is enough margin in the sample rate such that the entire signal bandwidth is still located in the positive (or negative) half of the spectrum.

The result is a signal with the same average data rate—i.e. half the amount of data, twice as often—but with a scheduling granularity that advantageously is half that of a baseband representation, since each of the data samples is real-valued and can be scheduled and routed independently.

Hence, as compared to the digital baseband representation, where one real and one imaginary component must be processed in sequence for each data sample with the corresponding delay, the processing delay for each data sample of the real-valued digital passband signal when scheduling and serializing the data samples is reduced by 50%.

At the remote units 109, 110, before transmitting the original RF signal received from the RBSs 101-104 via the antennas 105, 106 to any wireless communication devices, the inverse of the above described 3-step approach is performed at each of the channel TX filters 135-138; a baseband signal can be recreated from the passband signal of FIG. 5d by
(1) shifting the frequency back to baseband, and
(2) filtering the resulting complex signal to remove the unwanted image from the shifted negative frequency component, and
(3) downsampling (i.e. reducing) the sample rate $F_s$ by a factor 2.

Finally, after having transformed the digital signal of each respective channel back to the baseband representation shown in FIG. 5a, the channel TX filters reconstruct the signals of each channel such that they can be summed together with the other channels and converted from digital format to analogue format by the DACs 139, 140 before passing through a quadrature mixer/modulator 143, 144 at each remote unit 109, 110 after which the RF signals as provided by the RBSs 101-104 are regenerated (or created for the first time in the event of a digital baseband feed to the DAS 100 and transmitted via the antennas 105, 106.

In a practical implementation, it is possible to integrate some or all of the conversion steps into existing signal processing circuitry (since the receive path typically involves stages of frequency shifts and decimations, with the opposite steps in the transmit path) if use of baseband data representation is desired for internal processing. Alternatively, an implementation could choose to use a passband representation throughout.

A series of transformations to passband representation then back to baseband representation does not provide an identical baseband signal at the receiving end (since the filtering steps involved are non-ideal, and the process is not time-invariant). However, Nyquist's criterion is never violated so the essential properties of the signal are preserved and it is possible to recreate a RF signal with arbitrarily high fidelity at the output.

Figure 7:
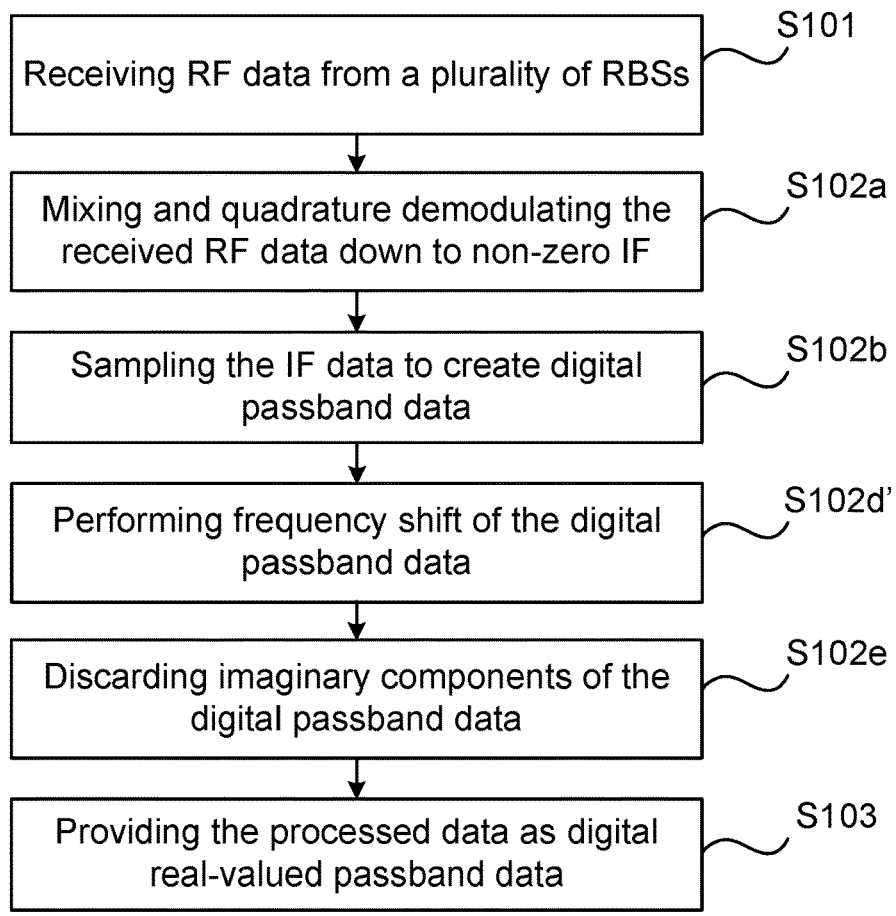
FIG. 7 illustrates a flowchart describing yet a further embodiment of a method according to the invention.

In an alternative embodiment, described with reference to the flowchart of FIG. 7, the input to the source units 107, 108 of the DAS 100 is an RF signal having been mixed down to IF—but not to zero but to any other appropriate intermediate frequency—or being mixed down and quadrature modulated within the DAS 100 with the quadrature mixer/demodulators 141, 142 in step S102a.

The ADCs 112, 113 will thus sample the analogue IF signal as a complex passband signal in step S102b.

Again, once the IF signal has been digitized, the processing consists of separating the different signals that make up the composite input signal by frequency-selective filtering in RX filters 114-117 (step S102b' of FIG. 3b). Hence, each channel has a frequency-selective digital filter 114-117 whose bandwidth is adapted to the characteristics of the respective signal source, i.e. each filter is tuned to the operating frequency of the corresponding RBS.

Further, the signals of the filtered channels are re-sampled/decimated at a reduced sample rate $F_s$ as previously discussed in step S102b" of FIG. 3b, which sample rate $F_s$ takes into account the actual bandwidth of the signals of the filtered channel.

Now, after this filtering, a complex digital signal comprising both real and imaginary components—as illustrated in FIG. 6c—has been obtained for each channel. The filtering may shift each channel to baseband so that it can be processed as independent I/Q signals. Alternatively, the filtering may be performed at passband without shifting each channel to baseband.

This complex digital passband signal is in this particular embodiment then transformed into a real-valued digital passband signal by shifting the signal in frequency to be centered at half the sample rate $F_s$ in step S102d' and then discarding, in step S102e, the imaginary component of the signal illustrated in FIG. 5c as previously has been discussed, which results in the real-valued digital passband signal illustrated with reference to FIG. 5d to be provided for further transport in the DAS 100 as illustrated with step S103.

Again, as compared with a digital baseband representation, the result is a signal with the same average data rate—i.e. half the amount of data, twice as often—but with a scheduling granularity that advantageously is half that of the baseband representation, since each of the data samples is real-valued and can be scheduled and routed independently.

Hence, as compared to the digital baseband representation, where one real and one imaginary component must be processed in sequence for each data sample with the corresponding delay, the processing delay for each data sample of the real-valued digital passband signal when scheduling and serializing the data samples is reduced by 50%.

Figure 8:
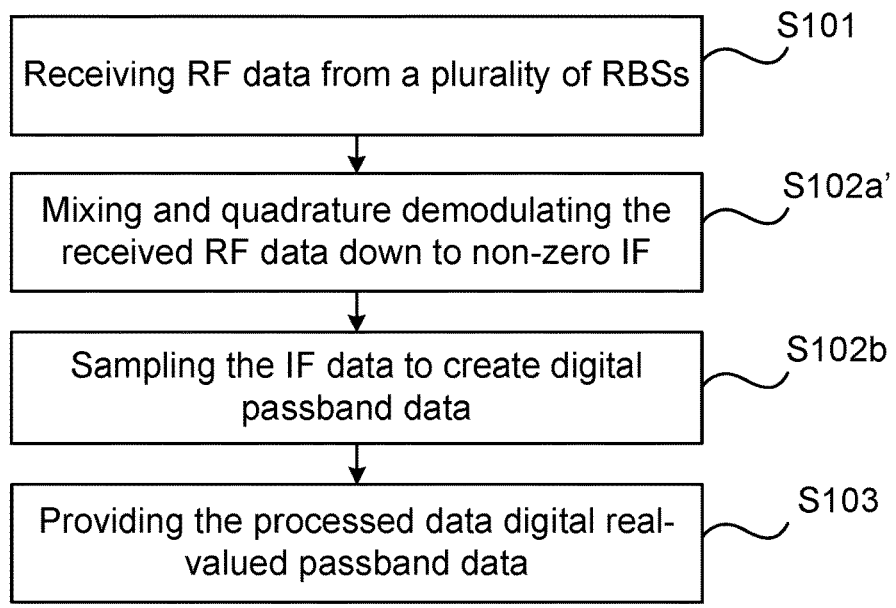
FIG. 8 illustrates a flowchart describing still a further embodiment of a method according to the invention.

In yet another embodiment, described with reference to the flowchart of FIG. 8, the input to the source units 107, 108 of the DAS 100 is an RF signal having been mixed down to IF—but not to zero but to an appropriate passband frequency—with a non-quadrature mixer/demodulator. Again, the mixing and non-quadrature demodulation may alternatively be performed by a non-quadrature mixer/demodulator 141, 142 located outside the source units 107, 108.

The ADCs 112, 113 will thus sample the analogue IF signal as a real-valued passband signal.

Again, once the IF signal has been digitized, the processing consists of separating the different signals that make up the composite input signal by frequency-selective filtering applied by the RX filters 114-117 as shown in step S102b' of FIG. 3b. Hence, each channel has a frequency-selective digital filter 114-117 whose bandwidth is adapted to the characteristics of the respective signal source, i.e. each filter is tuned to the operating frequency of the corresponding RBS.

Thereafter, the signals of the filtered channels are re-sampled or decimated with a lower sample rate $F_s$ to adapt to the bandwidth of the signals of the filtered channels, as has been discussed with reference to step S102b" of FIG. 3b.

Now, after this filtering, since the IF signal is sampled as a real passband signal, a real-valued digital passband signal—as illustrated in FIG. 5d—has been obtained for each channel.

Figure 9:
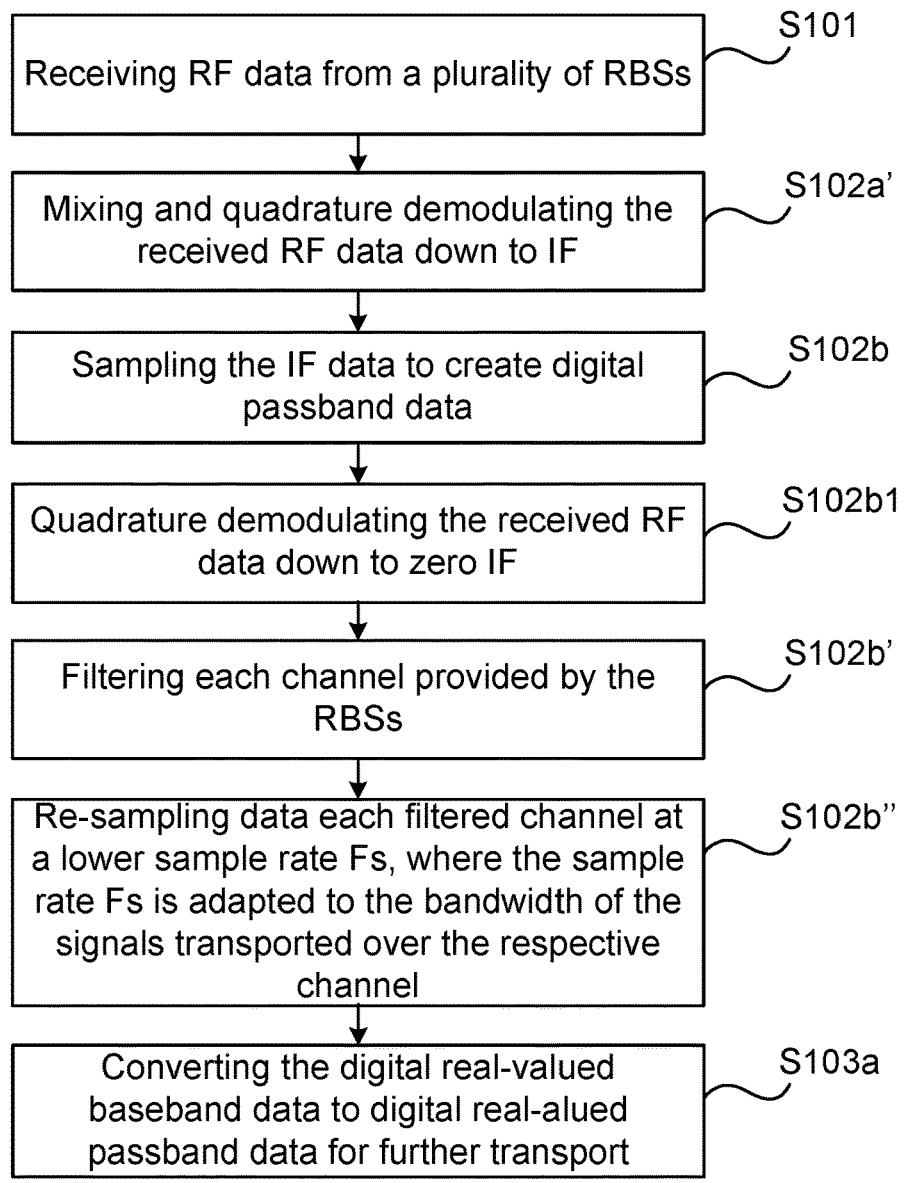
FIG. 9 illustrates a flowchart describing still another embodiment of a method according to the invention.

In an alternative embodiment, described with reference to the flowchart of FIG. 9, again with an RF signal being received in step S101 and mixed down to IF and non-quadrature demodulated in step S102a'; once the IF signal has been digitized in step S102b, the processing consists of separating the different signals that make up the composite input signal.

The digital real-valued passband signal attained after the ADC 112, 113 is processed for each channel with a digital quadrature demodulator in step S102b1 (implemented as a part of the RX filters 114-117) which shifts the real-valued passband signal for each channel to zero IF, by multiplying the received samples with a complex phasor with a frequency equal to the channel center frequency and where the real and imaginary components are 90 degrees out of phase, in a manner identical to the processing in an analogue quadrature demodulator. The frequency-selective RX filters 114-117 can then filter the real and imaginary components with low-pass filters adapted to the bandwidth of the wanted channel, as has been described in detail with reference to step S102b' of FIG. 3b, since the wanted channel is centered at 0 Hz. Thereafter, the data of the filtered channel is re-sampled in step S102b" at a lower sample rate $F_s$ adapted to the bandwidth of the data of the filtered channel, the reduce the amount of data being passed on to the scheduler and serializer. The resulting baseband signal for each channel is then converted into a passband signal in step S103a, using the method described previously for digital baseband signals, prior to being passed to the scheduler and serializer for transmission over the optical link.

In still another embodiment, the input to the source units 107, 108 of the DAS 100 is an RF signal which is not mixed down but only passed through a non-quadrature demodulator (not shown). This demodulator may be located within or outside the source units 107, 108.

The ADCs 112, 113 will thus sample the analogue RF signal as a real-valued passband signal.

Again, once the IF signal has been digitized, the processing consists of separating the different signals that make up the composite input signal by frequency-selective filtering. Hence, each channel has a frequency-selective digital filter 114-117 whose bandwidth is adapted to the characteristics of the respective signal source, i.e. each filter is tuned to the operating frequency of the corresponding RBS.

Figure 6D:
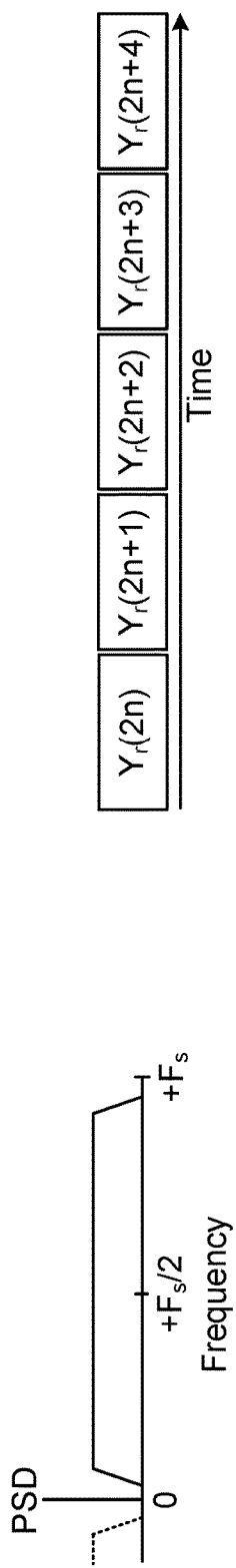

Now, after this filtering, since the RF signal is sampled as a real passband signal, a real-valued digital passband signal—as illustrated in FIG. 6d—has been obtained for each channel.

In still a further embodiment, the input to the source units 107, 108 of the DAS 100 is an already digitized signal, i.e. a digital baseband signal.

In such scenario, there is no need to demodulate or digitize the input signal, even though channel filtering still is necessary. The 3-step approach already described with reference to FIGS. 6a-d hereinabove will thus be undertaken for the received digital baseband signal. Further, as has been discussed, this may include a resampling of the input signal to reduce the sample rate of each base station signal for efficient utilization of the digital link.

As previously has been discussed, the DAS 100 illustrated in FIG. 1 shows a downlink path, i.e. transmit path, from the base stations to wireless communication devices (not shown) such as smart phones, tablets, smart watches, gaming consoles, etc. In an uplink path, i.e. receive path, the functionality of the remote units and source units would be reversed.

Even though the DAS 100 of FIG. 1 is divided into different functional entities such as the ADCs 112, 113, the RX filters 114-117, the schedulers 118, 119, the serializers 120, 121, etc., a modern DAS it typically implemented by means of a system of processing units executing computer programs to achieve the functionalities described herein.

Figure 10:
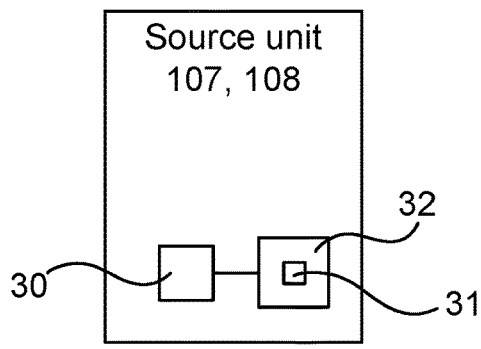
FIG. 10 illustrates a device according to an embodiment of the invention performing the methods disclosed herein.

With reference to FIG. 10, the steps of the method performed by the DAS 100, and in particular the source units 107, 108, are in practice performed by a processing unit 30 (or system of processing units) embodied in the form of one or more microprocessors arranged to execute a computer program 31 downloaded to a suitable storage medium 32 associated with the microprocessor, such as a Random Access Memory (RAM), a Flash memory or a hard disk drive. The processing unit 30 is arranged to cause the DAS 100 to carry out the method according to embodiments when the appropriate computer program 31 comprising computer-executable instructions is downloaded to the storage medium 32 and executed by the processing unit 30. The storage medium 32 may also be a computer program product comprising the computer program 31. Alternatively, the computer program 31 may be transferred to the storage medium 32 by means of a suitable computer program product, such as a Digital Versatile Disc (DVD) or a memory stick. As a further alternative, the computer program 31 may be downloaded to the storage medium 32 over a network. The processing unit 30 may alternatively be embodied in the form of a digital signal processor (DSP), an application specific integrated circuit (ASIC), a field-programmable gate array (FPGA), a complex programmable logic device (CPLD), etc.

The invention has mainly been described above with reference to a few embodiments. However, as is readily appreciated by a person skilled in the art, other embodiments than the ones disclosed above are equally possible within the scope of the invention, as defined by the appended patent claims.

The invention claimed is:

1. A method of transporting digital data in a Distributed Antenna System ("DAS"), the method comprising:
  receiving analogue radio frequency (RF) data from at least one data source;
  processing the received analogue RF data, wherein processing the received analogue RF data comprises:
    mixing the analogue RF data down to intermediate frequency (IF),
    sampling the IF data and processing to create complex valued digital baseband data,
    upsampling the complex valued digital baseband data,
    shifting the frequency of the upsampled complex valued digital baseband data to achieve data being located entirely at positive frequencies or entirely at negative frequencies,
    discarding either the real or imaginary component of each frequency-shifted complex valued digital baseband data sample, thereby creating digital real-valued passband data representing the complex valued digital baseband data,
    filtering channels provided by at least one data source to produce filtered data, the channels being received as composite data and digitized before the filtering, and
    re-sampling the filtered data of each filtered channel at a reduced sample rate being adapted to a highest bandwidth of the filtered data of the filtered channel being re-sampled; and
  transmitting the processed data as digital real-valued passband data for further processing within the DAS.

2. The method of claim 1, wherein the reduced sample rate is selected to be at least twice the bandwidth of the highest-bandwidth signal of the filtered channel being re-sampled.

3. The method of claim 1, wherein the received analogue RF data is quadrature demodulated to the IF.

4. The method of claim 1, wherein the received analogue RF data is non-quadrature demodulated to the IF.

5. The method of claim 4, wherein the processing of the received analogue RF data further comprises:
  sampling the IF data to create digital real-valued passband data, for further transport within the DAS.

6. The method of claim 5, further comprising:
  demodulating the digital real-valued passband data with a quadrature demodulator down to zero IF;
  filtering the quadrature demodulated data for each channel provided by at least one data source;
  re-sampling the filtered quadrature demodulated data of each channel at a reduced sample rate being adapted to a highest bandwidth of the quadrature demodulated data of the channel being re-sampled; and
  converting the real-valued digital baseband signal to a real-valued digital passband signal for further transport within the DAS.

7. The method of claim 1, wherein the received RF data is received as non-quadrature demodulated analogue radio frequency RF data.

8. The method of claim 1, wherein the at least one data source comprises one or more radio base stations when the data is received in a downlink direction.

9. The method of claim 1, wherein the at least one data source comprises one or more wireless communication devices when the data is received in an uplink direction.

10. A device configured to transport digital data in a Distributed Antenna System ("DAS"), the device comprising a processing unit and a memory, the memory containing instructions executable by the processing unit, wherein upon execution of the instructions, the device is operative to:
  receive analogue radio frequency (RF) data from at least one data source;
  process the received analogue RF data by:
    mixing the analogue RF data down to intermediate frequency (IF),
    sampling the IF data and processing to create complex valued digital baseband data,
    upsampling the complex valued digital baseband data,
    shifting the frequency of the upsampled complex valued digital baseband data to achieve data being located entirely at positive frequencies or entirely at negative frequencies,
    discarding either the real or imaginary component of each frequency-shifted complex valued digital baseband data sample, thereby creating digital real-valued passband data representing the complex valued digital baseband data,
    filtering channels provided by at least one data source to produce filtered data, the channels being received as composite data and digitized before the filtering; and
    re-sampling the filtered data of each filtered channel at a reduced sample rate being adapted to a highest bandwidth of the filtered data of the filtered channel being re-sampled; and
  transmit the processed data as digital real-valued passband data for further processing within the DAS.

11. The device of claim 10, wherein the reduced sample rate is selected to be at least twice the bandwidth of the highest-bandwidth signal of the filtered channel being re-sampled.

12. The device of claim 10, further being operative, upon executing the instructions, to quadrature demodulate the received RF data to the IF.

13. The device of claim 10, further being operative, upon executing the instructions, to non-quadrature demodulate the received RF data to the IF.

14. The device of claim 13, further being operative, upon executing the instructions, to when processing the received analogue RF data:
   sample the demodulated IF data to create digital real-valued passband data, for further transport within the DAS.

15. The device of claim 14, further being operative, upon executing the instructions, to:
   demodulate the digital real-valued passband data with a quadrature demodulator down to zero IF;
   filter the quadrature demodulated data for each channel provided by at least one data source;
   re-sample the filtered quadrature demodulated data of each channel at a reduced sample rate being adapted to a highest bandwidth of the quadrature demodulated data of the channel being re-sampled; and
   convert the real-valued digital baseband signal to a real-valued digital passband signal for further transport within the DAS.

16. The device of claim 10, further being operative, upon executing the instructions, to receive the received data as non-quadrature demodulated analogue RF data.

17. The device of claim 10, further being operative, upon executing the instructions, to receive the received data as analogue RF data, and to, when processing the received data:
   demodulate the analogue RF data with a non-quadrature demodulator.

18. The device of claim 10, wherein the at least one data source comprises one or more radio base stations when the data is received in a downlink direction.

19. The device of claim 10, wherein the at least one data source comprises one or more wireless communication devices when the data is received in an uplink direction.

20. A non-transitory computer readable medium, having a computer program stored thereon, that when executed by a processor, causes the processor to perform the steps of:
   receiving analogue radio frequency (RF) data from at least one data source;
   processing the received analogue RF data, wherein processing the received analogue RF data comprises:
      mixing the analogue RF data down to intermediate frequency (IF),
      sampling the IF data and processing to create complex valued digital baseband data,
      upsampling the complex valued digital baseband data,
      shifting the frequency of the upsampled complex valued digital baseband data to achieve data being located entirely at positive frequencies or entirely at negative frequencies,
      discarding either the real or imaginary component of each frequency-shifted complex valued digital baseband data sample, thereby creating digital real-valued passband data representing the complex valued digital baseband data,
      filtering channels provided by at least one data source to produce filtered data, the channels being received as composite data and digitized before the filtering, and
      re-sampling the filtered data of each filtered channel at a reduced sample rate being adapted to a highest bandwidth of the filtered data of the filtered channel being re-sampled; and
   transmitting the processed data as digital real-valued passband data for further processing within the DAS.

* * * * *